(12) United States Patent
Zollo

(10) Patent No.: US 12,448,861 B1
(45) Date of Patent: Oct. 21, 2025

(54) SEAL GLAND ASSEMBLY FOR A VALVE IN A TUBING HANGER

(71) Applicant: FMC Technologies, Inc., Houston, TX (US)

(72) Inventor: David Zollo, Spring, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 18/905,704

(22) Filed: Oct. 3, 2024

(51) Int. Cl.
*E21B 33/04* (2006.01)

(52) U.S. Cl.
CPC .................... *E21B 33/04* (2013.01)

(58) Field of Classification Search
CPC .............................. E21B 33/04; E21B 33/1208
See application file for complete search history.

(56) References Cited

U.S. PATENT DOCUMENTS

| | | | | |
|---|---|---|---|---|
| 2,939,534 | A * | 6/1960 | Allen | E21B 34/02 166/97.1 |
| 5,355,961 | A * | 10/1994 | Gariepy | E21B 33/04 285/123.3 |
| 2011/0073310 | A1* | 3/2011 | Clemens | E21B 23/06 166/135 |

* cited by examiner

*Primary Examiner* — Dany E Akakpo
(74) *Attorney, Agent, or Firm* — Erise IP, P.A.

(57) ABSTRACT

Systems and methods for providing and energizing a seal gland assembly on a valve in a tubing hanger are described. A seal gland assembly comprising a first seal, a second seal, and a third seal is provided in a seal gap formed longitudinally between a spacer and a seal prep of tubing hanger threads and laterally between a bore wall of the tubing hanger and a sidewall of the valve. As the valve is threaded into the tubing hanger, the seal prep of the tubing hanger presses the first seal into the second seal, the second seal is then pressed into the third seal, pressing the third seal against the spacer compressing the first seal, the second seal, and the third seal approximately filling the seal gap.

20 Claims, 5 Drawing Sheets

SEAL GLAND ASSEMBLY FOR A VALVE IN A TUBING HANGER

BACKGROUND

1. Field

Embodiments of the current disclosure relate to ring seals for valves. More specifically, embodiments of the current disclosure relate to energized seal gland assemblies for valves in tubing hangers.

2. Related Art

Typically, ring seal are provided around valves in tubing hangers of oil and gas well systems. In some scenarios, various valves such as a back pressure valve is placed in environments with a wide range of temperatures and pressures. For example, the back pressure valve and associated ring seals are required to withstand up to and beyond 15,000 pounds per square inch (psi) and temperatures ranging from below 0 degrees to more than 300 degrees Fahrenheit. Typical ring seals can be designed to withstand these upper temperatures or designed to withstand the lower temperatures; however, a single ring seal design operable to withstand the entire range of temperatures and pressures is extremely difficult to design. The ring seal can be made increasingly difficult to design by the expansion and contraction of rings seals under the variable temperatures and pressure within the ring gap provided by the typical back pressure valves and tubing hanger arrangements.

Furthermore, as the back pressure valve is used to isolate the pressure in the production tubing, the back pressure valve must be inserted into the tubing hanger through valves (e.g., upper and lower master valves) in a tree portion of the well (sometimes referred to in the art as a "Christmas" tree). Current production solutions are typically non-interference compression rings that are difficult to energize and unable to seal at higher pressure. High interference has been used in past solutions for high pressure/high temperature back pressure valves (BPV) and tree test plug (TTP) solutions. The upper and lower master valves include many components with exposed edges that can snag an exposed seal. As typical back pressure valve ring seals are exposed at, or slightly beyond the surface of the back pressure valves, these ring seals can get caught on edges of the valves and components thereof. These edges may damage the seals resulting in failure and/or replacement of the ring seals. Yet further, a tubing hanger may comprise various components such as Threaded and Coupled (T&C) connections (e.g., VAM TOP®) for coupling the back pressure valve to the tubing hanger. These T&C connections include protrusions and edges that may also snag the ring seal of the back pressure valve when the back pressure valve is being inserted into the tubing hanger.

What is needed are systems and methods of sealing the back pressure valve in the tubing hanger with a seal gland assembly capable of energizing in location and withstanding the wide temperature and pressure ranges described herein.

SUMMARY

Embodiments of the current disclosure solve the above-described problems and provide a distinct advance in the art by providing a seal gland assembly for a back pressure valve in a tubing hanger that is energized when the back pressure valve is inserted into the tubing hanger and is operable in a range of temperatures and a range of pressures described herein.

An embodiment of the current disclosure comprises a seal gland assembly of a valve. The seal gland assembly comprises a first seal positioned in a seal gap adjacent a threaded portion of the valve, wherein the seal gap is formed between a sidewall of the valve and a bore wall of a tubing hanger. The seal gland assembly further comprises a second seal positioned adjacent the first seal within the seal gap opposite the threaded portion, and a third seal comprising a body section and an elongated member and positioned at least partially within the seal gap adjacent the second seal opposite the first seal. When the valve is threaded into the tubing hanger the first seal presses against the second seal forcing the second seal to be lifted onto the elongated member and engaging the body section of the third seal, and wherein the first seal, the second seal, and the third seal are compressed to contact the sidewall of the valve and the bore wall of the tubing hanger.

An embodiment of the current disclosure comprises a method of energizing a seal gland assembly of a valve in a tubing hanger. The method comprises providing a first seal in a seal gap adjacent a threaded portion of the valve, wherein the seal gap is formed between at least a sidewall of the valve and a bore wall of the tubing hanger, providing a second seal positioned adjacent the first seal within the seal gap opposite the threaded portion, providing a third seal positioned at least partially within the seal gap adjacent the second seal opposite the first seal. The method further comprises threading the valve into the tubing hanger by engaging the threaded portion of the valve with tubing hanger threads and rotating the valve, as the valve is rotated, engaging the first seal with a portion of the tubing hanger threads forcing the first seal to contact the second seal and forcing the second seal to contact the third seal, and compressing the first seal, the second seal, and the third seal by continuing to thread the valve into the tubing hanger.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
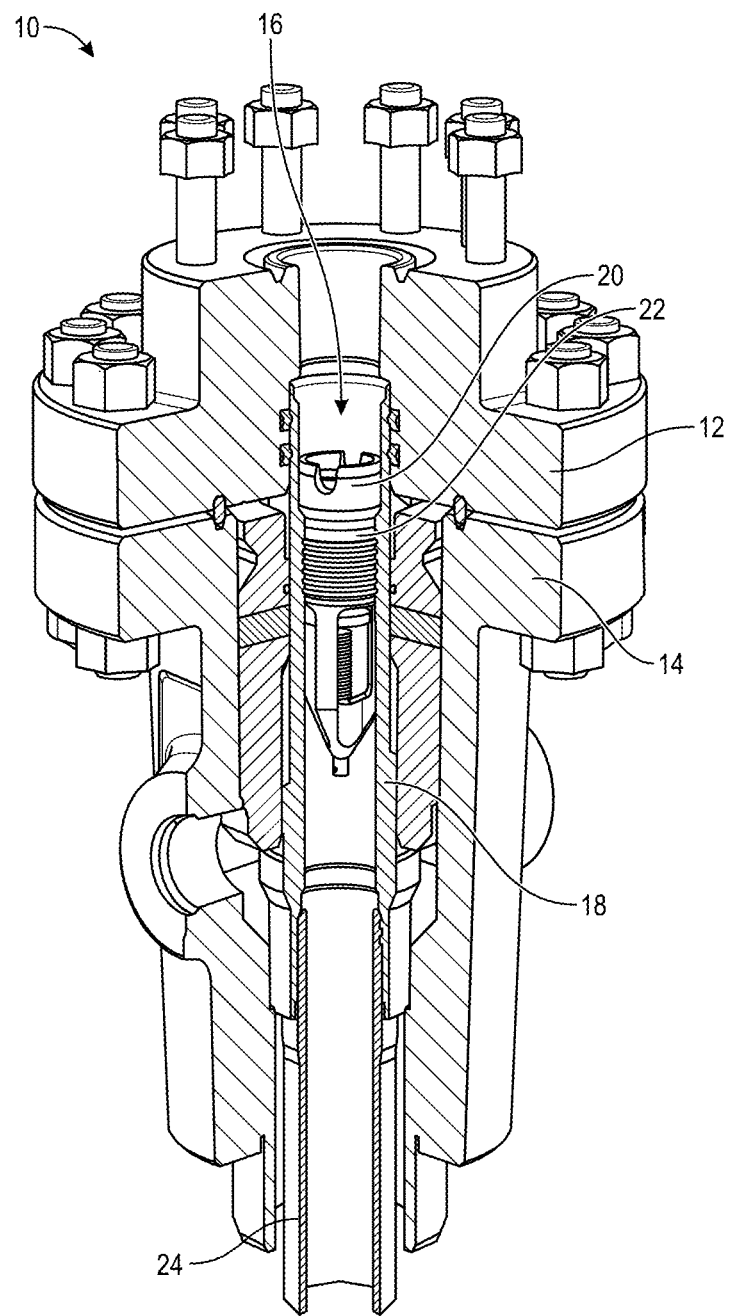
FIG. 1 depicts an exemplary back pressure valve disposed in a tubing hanger.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Generally, embodiments of the current disclosure provide a seal assembly comprising a gland-type seal for a valve/plug (e.g., back pressure valve (BPV), tree test plug (TTP), and two-way check valve (TWCV)) in a tubing hanger. In some embodiments, a pressure valve ring seal comprising a first seal, a second seal, and a third seal is provided on the BPV. The first seal, the second seal, and the third seal may be configured in a first configuration in a seal gap of the BPV. This first configuration allows the seal assembly to easily slide past features of valves in the tree section of the oil/gas well and the tubing hanger when the BPV is inserted into the tubing hanger. The BPV may then be threaded into place in the tubing hanger. While the BPV is rotated, BPV threads engage tubing hanger threads to thread the BPV into position in the tubing hanger. As the BPV is threaded into position, the seal assembly may contact the tubing hanger threads, or a thread backer known as a seal prep. This contact and subsequent squeezing of the seal assembly "energizes" the seal assembly. Here, energize means that the seal assembly is compressed into a second configuration described in detail below. The second configuration compresses the seal assembly causing the seal assembly to deform, substantially filling the seal gap and providing a force outward on a sidewall of the BPV, the seal prep, a spacer, and a wall of the tubing hanger. In some embodiments, energizing the seal assembly creates a near 100% seal between the BPV and the tubing hanger even when the valve is not under pressure or heated. In some embodiments, the seal assembly described herein is operable to seal the BPV and tubing hanger up to and beyond a pressure of 15,000 psi and temperatures from below 0 degrees Fahrenheit up to and beyond 300 degrees Fahrenheit.

FIG. 1 depicts an exemplary BPV 20 in tubing hanger 18 in well portion 10. Herein, the exemplary case of BPV 20 is described; however, it should be understood that BPV 20 could be a TTP, a TWCV, or any other valve that may be used as described. In some embodiments, tubing hanger 18 is configured to connect the tree, or upper portion 12 of an oil/gas well, with lower portion 14 comprising production tubing 24. Tubing hanger 18 may provide ports for electric and hydraulic lines as well as a location and connection for BPV 20. BPV 20 may provide a check valve for isolating the well and production tubing 24 below BPV 20 from the tree above. In some embodiments, the term "tubing hanger" used herein may generally reference tubing hanger 18 and components thereof. In some embodiments, tubing hanger 18 comprises various components such as Threaded and Coupled (T&C) connections for coupling BPV 20. For example, the T&C connection described herein may be a VAM TOP® or any other connection for installing BPV 20. It should be understood that "tubing hanger" referenced herein may comprise T&C connections such as, for example, VAM TOP®. Furthermore, as shown in FIG. 1, BPV 20 is an H-type BPV; however, it should be noted that seal gland assembly 22 may be used with any type of BPV.

In some embodiments, BPV 20 may be threaded into place inside tubing hanger 18. BPV 20 comprises BPV threads 36 (FIGS. 3A-3C) configured to interact with tubing hanger threads 34 such that BPV 20 is rotated into position inside tubing hanger 18. The threading provides a tight connection between BPV 20 and tubing hanger 18 that effectively locks BPV 20 into tubing hanger 18 to act as a check valve between production tubing 24 and tree tubing 16. In the threaded position (referenced as second configuration below and shown in FIG. 3C), BPV 20 is configured to prevent backflow of fluid under pressure in production tubing 24 but allow fluid to be forced into production tubing 24 from the above tree tubing 16 when a higher pressure is provided in the tree. Furthermore, BPV 20 comprises seal gland assembly 22 to prevent leakage of the fluid in production tubing 24 into upper portion 12 connected to the tree.

Figure 2A:
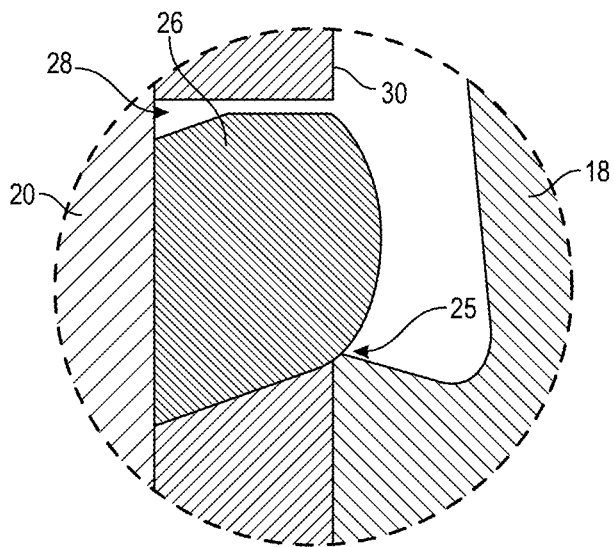
FIGS. 2A and 2B depict views of a back pressure valve ring seal in a tubing hanger with an edge.
Figure 2B:
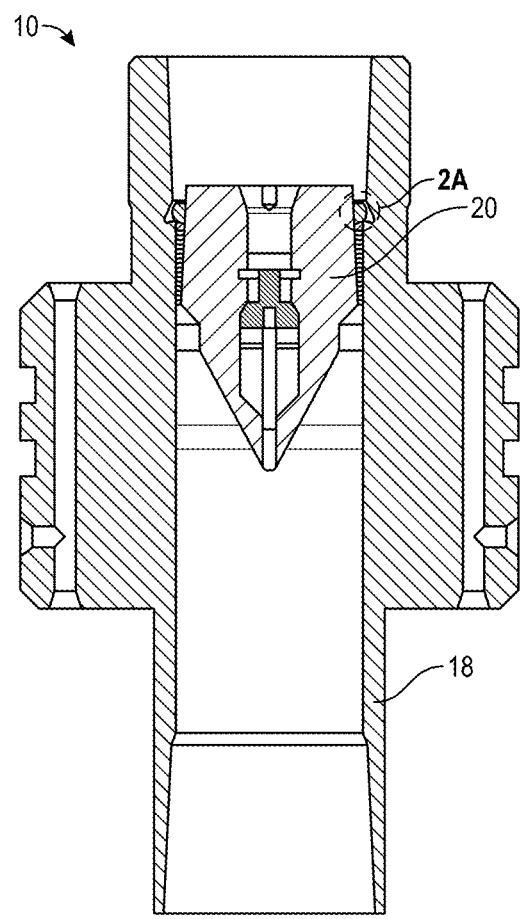

FIGS. 2A and 2B depict a closeup view of an exemplary interaction between BPV ring seal 26 (not seal gland assembly 22) and tubing hanger 18 during insertion of BPV 20 into a tubing hanger 18. As described above, BPV 20 is typically one of the final components to be disposed in a well before operation. As such, BPV 20 is generally inserted through various valves near components and component edges that may snag any protruding components of BPV 20. FIGS. 2A-2B depict an exemplary scenario providing edge 25 and BPV ring seal 26 where BPV ring seal 26 is a single gland provided in a BPV detent 28 and extending beyond BPV sidewall 30 of BPV 20. Here, as BPV 20 is inserted into tubing hanger 18 through the tree then the upper portion 12, edge 25 provides an obstacle that may snag BPV ring seal 26. Edge 25 may be a sharp ring around the interior of tubing hanger 18, which is representative of any obstacle that may be in any valve of the tree. As such, BPV ring seal 26 may get caught on edge 25 and be damaged. Seal gland assembly 22 is described herein to overcome these problems by providing an assembly of seals that is energized as described in embodiments below. As such, seal gland assembly 22 may be in line with BPV sidewall 30 or even slightly recessed in BPV detent 28 to prevent snagging on valves and edges of the tree and tubing hanger 18.

Figure 3A:
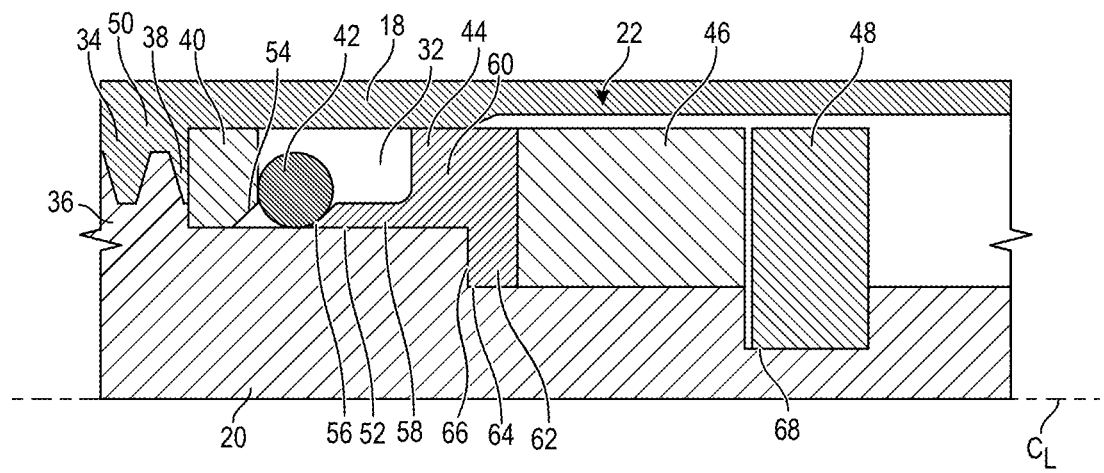
FIGS. 3A-3C depict an embodiment of a seal assembly of a back pressure valve in a tubing hanger.

FIG. 3A depicts a first configuration of seal gland assembly 22 where seal gland assembly 22 is not energized. Here, seal gland assembly 22 comprises first seal 40, second seal 42, third seal 44, and in some embodiments, spacer 46 and snap ring 48. First seal 40 is illustrated as a rectangular seal comprising first seal angle 54.

In some embodiments, in the first configuration shown in FIG. 3A where seal gland assembly 22 is not energized, seal gland assembly 22 leaves space in seal gap 32 such that seal gland assembly 22 rests level with or below spacer 46. This allows seal gland assembly 22 to move past edge 25 (FIG. 2A) without snagging as in the case of the BPV ring seal 26 described above. Here, seal gap 32 may provide a space longitudinally between spacer 46 and seal prep 38 and laterally between bore wall 50 of tubing hanger 18 and sidewall 52 of BPV 20. First seal 40, second seal 42, and third seal 44 may be provided in seal gap 32.

In some embodiments, first seal 40 comprises a thermoplastic polymer such as, for example, a polyaryletherketone (PEAK) such as polyetheretherketone (PEEK); however, the use of PEEK is exemplary, and any ring seal material may be used. In some embodiments, the materials of seal gland assembly 22 (i.e., first seal 40, second seal 42, and third seal 44) is compressible and durable and includes the thermal expansion properties necessary to meet the requirements described herein. Exemplary seal materials may include elastomers like nitrile (e.g., hydrogen nitrile butadiene rubber (HNBR)), Fluorine Kautschuk Material (FKM), polytetrafluoroethylene (PTFE), Teflon®, silicone, fluorosilicone, ethylene propylene (EPDM), and the like. As stated above, in some embodiments, first seal 40 may comprise PEEK. PEEK provides a high tensile strength material and is extremely extrusion resistant at the operational range of temperatures and pressure provided herein. In some embodiments, first seal 40 may also be referred to as a gland ring as the first seal 40 may not necessarily seal but provides energizing for seal gland assembly 22 to controllably fill seal gap 32. The energizing of seal gland assembly 22 is discussed in more detail below.

In some embodiments, first seal 40 comprises a rectangular cross section comprising a flat side configured to contact seal prep 38 of tubing hanger threads 34. First seal 40 may extend laterally entirely or nearly entirely from sidewall 52 of BPV 20 to bore wall 50 of tubing hanger 18 to control extrusion in operation at colder temperatures (e.g., 0 degrees Fahrenheit). Furthermore, first seal 40 may extend longitudinally from seal prep 38 to second seal 42 while not compressed or only slightly compressed laterally in the configuration shown in FIG. 3A. The longitudinal dimensions of each seal of seal gland assembly 22 control the fill of seal gap 32 as described in detail below.

Although a rectangular cross section is shown, other embodiments may present other geometries. In some embodiments, first seal 40 may comprise a circular, triangular, or other polygonal shape, or the like. In some embodiments, first seal 40 may comprise any abstract shape that may fit together with second seal 42 and third seal 44 to optimally energize seal gland assembly 22 and fill or nearly fill seal gap 32. As such, it should be understood that first seal 40 may be any shape that performs the functions described herein. Furthermore, as described below, the cross-sectional geometry of first seal 40 may change depending on compression, temperature, and pressure provided.

Second seal 42 is illustrated with a circular cross section in FIG. 3A. In some embodiments, second seal 42 comprises the exemplary seal materials described in regard to first seal 40 above. In some embodiments, second seal 42 may comprise various materials such as FKM, perfluoroelastomer (FFKM), or the like. The exemplary material herein comprises HNBR, but it should be understood that any material capable of withstanding the temperatures, pressures, and functioning as described herein may be used. HNBR provides the necessary strength and expansion properties at the operation temperatures and pressures described herein. Furthermore, in some embodiments, second seal 42 may be positioned longitudinally between first seal 40 and third seal 44 and laterally between sidewall 52 of BPV 20 and bore wall 50 of tubing hanger 18. Specifically, when seal gland assembly 22 is not energized, as shown in FIG. 3A, second seal 42 may be positioned between first seal 40 and elongated member angle 56 of third seal 44. This provides non-filled space in seal gap 32 that may be filled when seal gland assembly 22 is energized (FIG. 3C).

As shown, second seal 42 comprises a circular cross section when not compressed. The circular cross section is exemplary; however, the circular cross section may aid in moving second seal 42 onto elongated member 58 of third seal 44 as described below. Furthermore, in some embodiments, a cross-sectional diameter of second seal 42 may be equal to or slight less than a distance between sidewall 52 and bore wall 50. As such, under pressure from first seal 40, second seal 42 may move onto elongated member 58 as described below.

Third seal 44 is illustrated in FIG. 3A comprising body section 60, flange 62, and elongated member 58 comprising elongated member angle 56. In some embodiments, third seal 44 comprises any combination of the seal materials listed above. In some embodiments, third seal 44 comprises PTFE. PTFE typically is a filled material and has a high tensile strength in the range of 3,000 to 5,000 psi and is extremely smooth, which allows it to slide into place easily between bore wall 50 and sidewall 52 providing a form fit to prevent extrusion at low temperatures (e.g., 0 degrees Fahrenheit). Furthermore, PTFE has a coefficient of thermal expansion (CTE) of 1.2-1.7 microstrain/degree Fahrenheit, which provides expansion across the operational range of temperatures and pressures described herein. Furthermore, the CTE allows seal gland assembly 22 to increase in outward pressure on bore wall 50 and sidewall 52 as the temperature and pressure in production tubing 24 increases while still allowing a sufficient fill and sidewall and wall pressure at the lowest temperatures.

As shown in FIG. 3A, body section 60 of third seal 44 is depicted with a rectangular cross section; however, body section 60 may be any polygonal or abstract shape as described above. Furthermore, in some embodiments, third seal 44 comprises elongated member 58 extending from body section 60 longitudinally toward second seal 42. Elongated member 58 may comprise the same or different material as body section 60 and may be integrally formed with body section 60. Elongated member 58 may extend approximately the width (e.g., diameter) of second seal 42. Therefore, when energized, as shown in FIG. 3C, second seal 42 may be positioned on elongated member 58 spanning then length of elongated member 58 such that elongated member angle 56 contacts first seal angle 54. As such, first seal angle 54 and elongated member 58 may comprise complimentary angles such that as much surface area is in contact around the gland.

In some embodiments, third seal 44 comprises flange 62. Flange 62 may be positioned between spacer 46 and BPV 20 ledge 64 as shown in FIG. 3A. Flange 62 may be configured to secure the third seal 44 adjacent spacer 46 such that flange 62 does not move when seal gland assembly 22 is energized. First seal 40 and second seal 42 may move to third seal 44 as BPV 20 is threaded into tubing hanger 18 as described in detail below.

In some embodiments, it may be efficient to provide geometries of first seal 40, second seal 42, and/or third seal 44 that are different than shown. First seal 40, second seal 42, and third seal 44 fit together when energized to fill, or nearly fill, seal gap 32 to provide a 360-degree gland seal between BPV 20 and tubing hanger 18 at the specified temperature and pressure ranges described herein. As such, the geometries may be different than shown in FIGS. 3A-3C.

In some embodiments, spacer 46 and snap ring 48 are provided at a distal end of seal gland assembly 22 to hold seal gland assembly 22 in place. Spacer 46 may be provided between snap ring 48 and third seal 44. In some embodiments, BPV 20 provides BPV detent 68 such that snap ring 48 may be provided around and secured on BPV 20. Snap ring 48 may be secured in BPV detent 68 providing a solid base for seal gland assembly 22. Spacer 46 may be provided between snap ring 48 and third seal 44 to secure third seal 44 in, or at least partially in seal gap 32 by fixing flange 62 between spacer 46 and BPV ledge 66. As such, the combination of snap ring 48 and spacer 46 secure third seal 44, second seal 42, and third seal 44 in seal gap 32. It should be noted that other methods of retaining first seal 40, second seal 42, and third seal 44 may be used (e.g., a threaded ring) and that spacer 46 and snap ring 48 are exemplary.

Figure 3B:
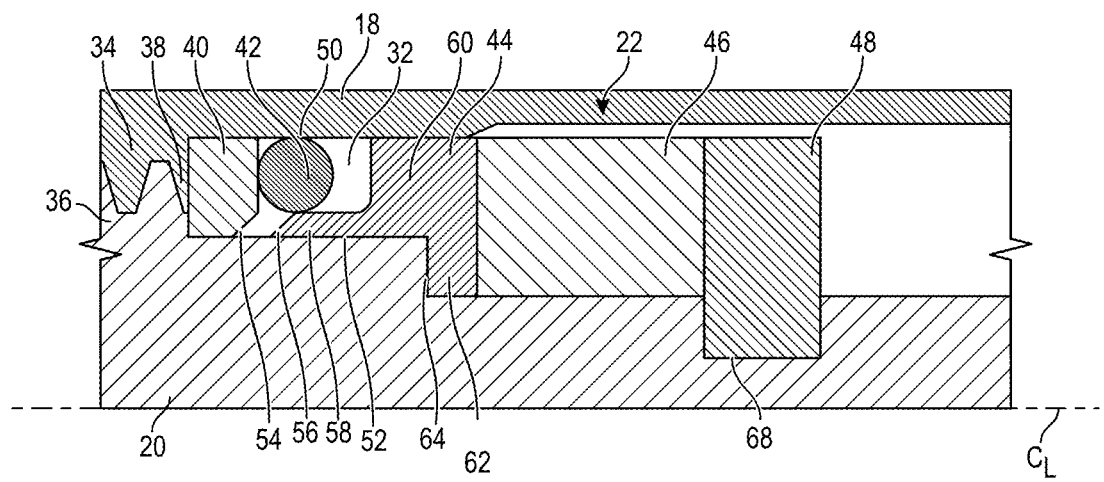
Figure 3C:
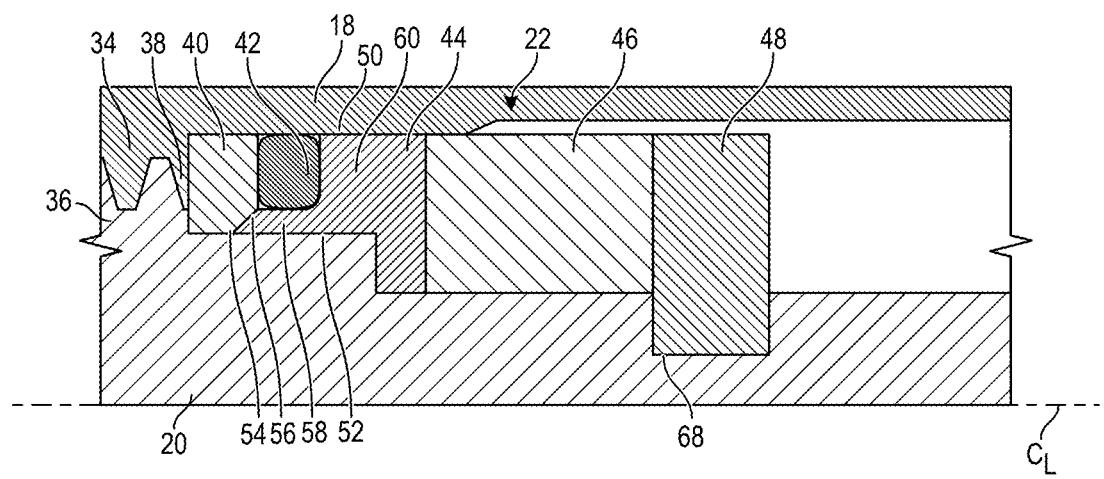

FIG. 3B depicts an intermediate configuration of seal gland assembly 22 where BPV 20 is partially threaded into tubing hanger 18. As shown, BPV threads 36 engage tubing hanger threads 34 as BPV 20 is rotated into position. As BPV 20 rotates and is threaded into tubing hanger 18, seal prep 38 may engage first seal 40. In some embodiments, seal prep 38 may be a first thread of tubing hanger threads 34 providing a surface configured to engage seal gland assembly 22. In some embodiments, seal prep 38 provides a flat surface, as shown; however, seal prep 38 may provide any angle for contacting first seal 40. As such, first seal 40 may provide a surface at or approximately at the same angle or complementary to the angle of seal prep 38. Furthermore, as first seal 40 is compressed against seal prep 38, first seal 40 may plastically deform matching the angle of seal prep 38.

In some embodiments, BPV 20 is threaded into tubing hanger 18 while seal prep 38 engages first seal 40, first seal 40 then presses against second seal 42, and second seal 42 is lifted onto elongated member 58 as shown in FIG. 3B. Elongated member 58 comprises elongated member angle 56 configured to aid in raising second seal 42 onto elongated member 58 as seal gap 32 becomes smaller. Once second seal 42 is on elongated member 58, second seal 42 may contact both elongated member 58 and bore wall 50. In some embodiments, second seal 42 may be slightly compressed between elongated member 58 and bore wall 50, and in some embodiments, second seal 42 diameter may be slightly less than the distance between elongated member 58 and bore wall 50. As BPV 20 is threaded into tubing hanger 18, seal prep 38 presses against first seal 40, first seal 40 presses against second seal 42, and second seal 42 moves closer and closer to body section 60 of third seal 44 as third seal 44 is secured against spacer 46.

FIG. 3C depicts an energized configuration of seal gland assembly 22. Here, BPV 20 has been threaded into tubing hanger 18 by providing an amount of torque to compress seal gland assembly 22 filling, or nearly filling, a volume of the seal gap 32. In some embodiments, seal gap 32 may be filled at least 90%, at least 95%, at least 98% or up to 100% by seal gland assembly 22. As used herein, the seal gland assembly 22 "approximately filling" the seal gap 32 provides for the seal gland assembly 22 filling at least 95% of a volume of the seal gap 32 when the seal gland assembly 22 is compressed in the seal gap 32 in the energized configuration or state. As BPV 20 is threaded into tubing hanger 18, first seal 40 may press against second seal 42 and second seal 42 may press against third seal 44 until each of the seals is compressed providing a resistance force against the torque. As described above, each of first seal 40, second seal 42, and third seal 44 comprises compressible materials such that as seal gland assembly 22 is squeezed by seal prep 38 moving toward spacer 46 (secured by snap ring 48), the compressible materials are compressed providing resistance to the threading. As the resistance reaches a predetermined force equivalent to a designed torque applied to BPV 20, threading is stopped. At this point, BPV 20 is in its operational location, and seal gland assembly 22 is energized shown in FIG. 3C.

In some embodiments, as first seal 40, second seal 42, and third seal 44 comprise compressible materials, the geometry of each seal may change as seal gland assembly 22 is compressed. As shown, second seal 42 was configured with a circular cross section when not energized. Here, second seal 42 has been compressed longitudinally to fill the space between first seal 40 and body section 60 of third seal 44 and laterally compressed to fill the space between elongated member 58 and bore wall 50. Accordingly, the cross section of second seal 42 has deformed into more of a rectangular or square shape. Furthermore, first seal 40 and third seal 44 may also deform when squeezed together and compressed. Again, the cross-sectional shapes shown and described herein are exemplary and any shape may be provided such that the fill of seal gap 32 is controlled. In some embodiments, seal gland assembly 22 is compressed 360 degrees around BPV 20 providing a gland seal between BPV 20 and tubing hanger 18.

Once BPV 20 is in place, operation of the well may commence. Pressure may be provided to BPV 20 and BPV 20 may be operational to separate the fluid in production tubing 24 from the upper portion 12 connected to the tree above. In some embodiments, fluids may be provided from the tree to the well in higher pressures than exist in the well and the production tubing 24 below BPV 20. As described above, seal gland assembly 22 may be operable to seal BPV 20 and tubing hanger 18 up to and beyond pressures of 15,000 psi and temperatures from or below 0 degrees Fahrenheit up to and beyond 300 degrees Fahrenheit.

Figure 4:
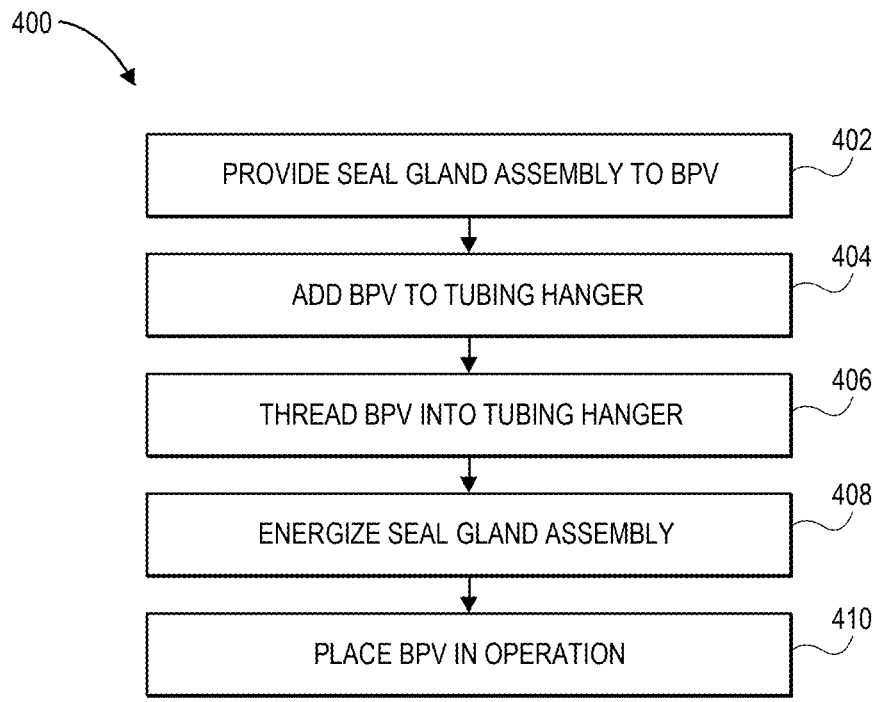
FIG. 4 depicts a flow diagram illustrating a process of providing and energizing the seal assembly for operation with the back pressure valve and the tubing hanger of FIGS. 3A-3C.

FIG. 4 depicts a flow chart illustrating an exemplary process of energizing the seal gland assembly 22 generally referenced herein by numeral 400. At step 402, seal gland assembly 22 may be provided on BPV 20. In some embodiments, BPV 20 may comprise a BPV detent 68 configured to receive snap ring 48 configured to secure seal gland assembly 22 in place around BPV 20. First seal 40 may be provided to seal gap 32 adjacent BPV threads 36. Next, second seal 42 may be provided adjacent first seal 40 then third seal 44 may be provided adjacent second seal 42 where third seal 44 is at least partially within seal gap 32. Snap ring 48 may be provided in BPV detent 68 and spacer 46 may be provided adjacent snap ring 48 between snap ring 48 and third seal 44 to secure third seal 44 in place. Therefore, first seal 40, second seal 42, and third seal 44, may be secured and, in some embodiments, compressed between seal prep 38 and spacer 46 (against snap ring 48) as BPV 20 is threaded into tubing hanger 18.

At step 404, BPV 20 is inserted into tubing hanger 18. As BPV 20 is one of the last components to be added to the well, BPV 20 must be added to tubing hanger 18 through valves in the tree above tubing hanger 18. As described above, this may be difficult with typical ring seals as the typical ring seals may extend beyond the edge of BPV 20 and may get caught on components of the tree valves and components of the tubing hanger 18. As seal gland assembly 22 is not energized at this stage, the components are positioned at or below the side of BPV 20 such that seal gland assembly 22 does not snag any components of seal gland assembly 22.

At step 406, BPV 20 is threaded into tubing hanger 18. In some embodiments, BPV threads 36 engage tubing hanger threads 34. BPV 20 may be rotated threading BPV 20 into tubing hanger 18 and seal prep 38 may contact and press against first seal 40. First seal 40 may in turn press against and move second seal 42 onto elongated member 58 of third seal 44. Continuing to thread BPV 20 may move second seal 42 to contact body section 60 of third seal 44. Furthermore, elongated member angle 56 of elongated member 58 may contact first seal angle 54 of first seal 40.

At step 408, BPV 20 is further threaded into tubing hanger 18. As BPV 20 is threaded, seal gland assembly 22 may be compressed energizing seal gland assembly 22. In some embodiments, first seal 40, second seal 42, and third seal 44 may be compressed between seal prep 38 and spacer 46. As first seal 40, second seal 42, and third seal 44 deform, seal gland assembly 22 may fill seal gap 32 to 100% or near 100% (e.g., 98%). As seal gland assembly 22 is compressed, a compression force is exerted by seal gland assembly 22 against BPV sidewall 52, seal prep 38, spacer 46, and bore wall 50 of tubing hanger 18 until the threading is stopped when a predetermined torque is applied to BPV 20.

At step 410, BPV 20 may be put into operation. Pressure from the well may be provided to BPV 20 separating the pressure in the production tubing 24 from the tree above the BPV 20. In some embodiments, fluids may be provided from the tree to the well in higher pressures than exist in the well and the production tubing 24 below BPV 20. As described above, seal gland assembly 22 may be operable to seal BPV 20 and tubing hanger 18 up to and beyond a pressure of 15,000 psi and temperatures from or below 0 degrees Fahrenheit up to and beyond 300 degrees Fahrenheit.

In some aspects, the techniques described herein relate to a seal gland assembly of a valve, the seal gland assembly including: a first seal positioned in a seal gap adjacent a threaded portion of the valve, wherein the seal gap is formed between a sidewall of the valve and a bore wall of a tubing hanger; a second seal positioned adjacent the first seal within the seal gap opposite the threaded portion; and a third seal including a body section and an elongated member and positioned at least partially within the seal gap adjacent the second seal opposite the first seal, wherein when the valve is threaded into the tubing hanger the first seal presses against the second seal forcing the second seal to be lifted onto the elongated member and engaging the body section of the third seal, and wherein the first seal, the second seal, and the third seal are compressed to contact the sidewall of the valve and the bore wall of the tubing hanger.

In some aspects, the techniques described herein relate to a seal gland assembly, wherein the elongated member includes an elongated member angle configured to contact a first seal angle of the first seal adjacent the sidewall when the first seal, the second seal, and the third seal are compressed.

In some aspects, the techniques described herein relate to a seal gland assembly, further including: a spacer positioned adjacent the third seal; and a snap ring positioned adjacent the spacer and configured to secure the spacer, the third seal, the second seal, and the first seal in the seal gap, wherein the first seal, the second seal, and the third seal are compressed longitudinally between the spacer and the threaded portion and laterally between the sidewall of the valve and the bore wall of the tubing hanger, and wherein the third seal further includes a flange positioned between a ledge of the valve and the spacer.

In some aspects, the techniques described herein relate to a seal gland assembly, wherein the valve is one of a back pressure valve, a tree test plug, or a two-way check valve.

In some aspects, the techniques described herein relate to a seal gland assembly, wherein the second seal includes a circular cross section.

In some aspects, the techniques described herein relate to a seal gland assembly, wherein the first seal and the third seal extend laterally from the sidewall of the valve to the bore wall of the tubing hanger at temperatures below zero degrees Fahrenheit.

In some aspects, the techniques described herein relate to a seal gland assembly, wherein the first seal includes polyetheretherketone (PEEK).

In some aspects, the techniques described herein relate to a seal gland assembly, wherein the second seal includes hydrogen nitrile butadiene rubber (HNBR), Fluorine Kautschuk Material (FKM), or perfluoroelastomer (FFKM).

In some aspects, the techniques described herein relate to a seal gland assembly, wherein the third seal includes polytetrafluoroethylene (PTFE).

In some aspects, the techniques described herein relate to a method of energizing a seal gland assembly of a valve in a tubing hanger, the method including: providing a first seal in a seal gap adjacent a threaded portion of the valve, wherein the seal gap is formed between at least a sidewall of the valve and a bore wall of the tubing hanger; providing a second seal positioned adjacent the first seal within the seal gap opposite the threaded portion; providing a third seal positioned at least partially within the seal gap adjacent the second seal opposite the first seal; threading the valve into the tubing hanger by engaging the threaded portion of the valve with tubing hanger threads and rotating the valve; as the valve is rotated, engaging the first seal with a portion of the tubing hanger threads forcing the first seal to contact the second seal and forcing the second seal to contact the third seal; and compressing the first seal, the second seal, and the third seal by continuing to thread the valve into the tubing hanger.

In some aspects, the techniques described herein relate to a method, further including: as the valve is rotated, moving the second seal onto an elongated member of the third seal and engaging the second seal with a body section of the third seal; engaging a first seal angle of the first seal with an elongated member angle of the elongated member angle, wherein the first seal angle and the elongated member angle are complimentary angles.

In some aspects, the techniques described herein relate to a method, further including: securing the third seal between the second seal and a spacer; and securing the spacer between the third seal and a snap ring, wherein the first seal, the second seal, and the third seal are compressed longitudinally between the spacer and the portion of the tubing hanger threads and laterally between the sidewall of the valve and the bore wall of the tubing hanger.

In some aspects, the techniques described herein relate to a method, further including compressing a flange of the third seal between a ledge of the valve and the spacer.

In some aspects, the techniques described herein relate to a method, wherein the first seal and the third seal extend laterally from the sidewall of the valve to the bore wall of the tubing hanger at temperatures below zero degrees Fahrenheit.

In some aspects, the techniques described herein relate to a method, wherein the first seal includes polyetheretherketone (PEEK), wherein the second seal includes hydrogen nitrile butadiene rubber (HNBR), and wherein the third seal includes polytetrafluoroethylene (PTFE).

In some aspects, the techniques described herein relate to a method of energizing a seal gland assembly of a valve in a tubing hanger, the method including: providing a first seal in a seal gap adjacent a threaded portion of the valve, wherein the seal gap is formed laterally between a sidewall of the valve and a bore wall of the tubing hanger and longitudinally between the threaded portion and a spacer; providing a second seal positioned adjacent the first seal within the seal gap opposite the threaded portion; providing a third seal including a body section and an elongated member and positioned at least partially within the seal gap adjacent the second seal opposite the first seal; threading the valve into the tubing hanger by engaging the threaded portion of the valve with tubing hanger threads and rotating the valve; as the valve is rotated, engaging the first seal with a seal prep of the tubing hanger threads forcing the first seal into the second seal and forcing the second seal onto the elongated member and engaging the body section of the third seal; and compressing the first seal, the second seal, and the third seal between the seal prep and the spacer by continuing to thread the valve into the tubing hanger.

In some aspects, the techniques described herein relate to a method, further including contacting a first seal angle of the first seal with an elongated member angle of the third seal when the first seal, the second seal, and the third seal are compressed.

In some aspects, the techniques described herein relate to a method, further including securing the spacer, the third seal, the second seal, and the first seal in the seal gap by a snap ring positioned adjacent the spacer opposite the third seal.

In some aspects, the techniques described herein relate to a method, further including securing the third seal by a flange positioned between a ledge of the valve and the spacer.

In some aspects, the techniques described herein relate to a method, wherein the first seal and the third seal extend laterally from the sidewall of the valve to the bore wall of the tubing hanger at temperatures below zero degrees Fahrenheit.

Although the invention has been described with reference to the embodiments illustrated in the attached drawing figures, it is noted that equivalents may be employed, and substitutions made herein without departing from the scope of the invention.

Having thus described various embodiments of the disclosure, what is claimed as new and desired to be protected by Letters Patent includes the following:

The invention claimed is:

1. A seal gland assembly of a valve, the seal gland assembly comprising:
   a first seal positioned in a seal gap adjacent a threaded portion of the valve,
   wherein the seal gap is formed between a sidewall of the valve and a bore wall of a tubing hanger;
   a second seal positioned adjacent the first seal within the seal gap opposite the threaded portion; and
   a third seal comprising a body section and an elongated member and positioned at least partially within the seal gap adjacent the second seal opposite the first seal,
   wherein when the valve is threaded into the tubing hanger the first seal presses against the second seal forcing the second seal to be lifted onto the elongated member and engaging the body section of the third seal, and
   wherein the first seal, the second seal, and the third seal are compressed to contact the sidewall of the valve and the bore wall of the tubing hanger.

2. The seal gland assembly of claim 1, wherein the elongated member comprises an elongated member angle configured to contact a first seal angle of the first seal adjacent the sidewall when the first seal, the second seal, and the third seal are compressed.

3. The seal gland assembly of claim 1, further comprising:
   a spacer positioned adjacent the third seal; and
   a snap ring positioned adjacent the spacer and configured to secure the spacer, the third seal, the second seal, and the first seal in the seal gap,
   wherein the first seal, the second seal, and the third seal are compressed longitudinally between the spacer and the threaded portion and laterally between the sidewall of the valve and the bore wall of the tubing hanger, and
   wherein the third seal further comprises a flange positioned between a ledge of the valve and the spacer.

4. The seal gland assembly of claim 1, wherein the valve is one of a back pressure valve, a tree test plug, or a two-way check valve.

5. The seal gland assembly of claim 1, wherein the second seal comprises a circular cross section.

6. The seal gland assembly of claim 1, wherein the first seal and the third seal extend laterally from the sidewall of the valve to the bore wall of the tubing hanger at temperatures below zero degrees Fahrenheit.

7. The seal gland assembly of claim 1, wherein the first seal comprises polyetheretherketone (PEEK).

8. The seal gland assembly of claim 1, wherein the second seal comprises hydrogen nitrile butadiene rubber (HNBR), Fluorine Kautschuk Material (FKM), or perfluoroelastomer (FFKM).

9. The seal gland assembly of claim 1, wherein the third seal comprises polytetrafluoroethylene (PTFE).

10. A method of energizing a seal gland assembly of a valve in a tubing hanger, the method comprising:
    providing a first seal in a seal gap adjacent a threaded portion of the valve,
    wherein the seal gap is formed between at least a sidewall of the valve and a bore wall of the tubing hanger;
    providing a second seal positioned adjacent the first seal within the seal gap opposite the threaded portion;
    providing a third seal positioned at least partially within the seal gap adjacent the second seal opposite the first seal;
    threading the valve into the tubing hanger by engaging the threaded portion of the valve with tubing hanger threads and rotating the valve;
    as the valve is rotated, engaging the first seal with a portion of the tubing hanger threads forcing the first seal to contact the second seal and forcing the second seal to contact the third seal;
    as the valve is rotated, moving the second seal onto an elongated member of the third seal and engaging the second seal with a body section of the third seal;
    engaging a first seal angle of the first seal with an elongated member angle of the elongated member,
    wherein the first seal angle and the elongated member angle are complimentary angles; and
    compressing the first seal, the second seal, and the third seal by continuing to thread the valve into the tubing hanger.

11. The method of claim 10, further comprising:

securing the third seal between the second seal and a spacer; and securing the spacer between the third seal and a snap ring, wherein the first seal, the second seal, and the third seal are compressed longitudinally between the spacer and the portion of the tubing hanger threads and laterally between the sidewall of the valve and the bore wall of the tubing hanger.

12. The method of claim 11, further comprising compressing a flange of the third seal between a ledge of the valve and the spacer.

13. The method of claim 10, wherein the first seal and the third seal extend laterally from the sidewall of the valve to the bore wall of the tubing hanger at temperatures below zero degrees Fahrenheit.

14. The method of claim 10, wherein the first seal comprises polyetheretherketone (PEEK), wherein the second seal comprises hydrogen nitrile butadiene rubber (HNBR), and wherein the third seal comprises polytetrafluoroethylene (PTFE).

15. A method of energizing a seal gland assembly of a valve in a tubing hanger, the method comprising:

providing a first seal in a seal gap adjacent a threaded portion of the valve, wherein the seal gap is formed laterally between a sidewall of the valve and a bore wall of the tubing hanger and longitudinally between the threaded portion and a spacer;

providing a second seal positioned adjacent the first seal within the seal gap opposite the threaded portion;

providing a third seal comprising a body section and an elongated member and positioned at least partially within the seal gap adjacent the second seal opposite the first seal;

threading the valve into the tubing hanger by engaging the threaded portion of the valve with tubing hanger threads and rotating the valve;

as the valve is rotated, engaging the first seal with a seal prep of the tubing hanger threads forcing the first seal into the second seal and forcing the second seal onto the elongated member and engaging the body section of the third seal; and compressing the first seal, the second seal, and the third seal between the seal prep and the spacer by continuing to thread the valve into the tubing hanger.

16. The method of claim 15, further comprising contacting a first seal angle of the first seal with an elongated member angle of the third seal when the first seal, the second seal, and the third seal are compressed.

17. The method of claim 15, further comprising securing the spacer, the third seal, the second seal, and the first seal in the seal gap by a snap ring positioned adjacent the spacer opposite the third seal.

18. The method of claim 15, further comprising securing the third seal by a flange positioned between a ledge of the valve and the spacer.

19. The method of claim 15, wherein the first seal and the third seal extend laterally from the sidewall of the valve to the bore wall of the tubing hanger at temperatures below zero degrees Fahrenheit.

20. The method of claim 15, wherein the first seal, the second seal, and the third seal are configured to fill the seal gap between the spacer and the threaded portion when compressed.

* * * * *